United States Patent
Kuramochi et al.

(10) Patent No.: US 12,555,390 B2
(45) Date of Patent: Feb. 17, 2026

(54) STOP LINE RECOGNITION DEVICE

(71) Applicant: SUBARU CORPORATION, Tokyo (JP)

(72) Inventors: Hiroaki Kuramochi, Tokyo (JP); Tetsuo Shiraishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 352 days.

(21) Appl. No.: 18/312,049

(22) Filed: May 4, 2023

(65) Prior Publication Data

US 2023/0386224 A1 Nov. 30, 2023

(30) Foreign Application Priority Data

May 27, 2022 (JP) .................................. 2022-086745

(51) Int. Cl.
*G06V 20/56* (2022.01)
*G06V 10/60* (2022.01)

(52) U.S. Cl.
CPC ............ *G06V 20/588* (2022.01); *G06V 10/60* (2022.01)

(58) Field of Classification Search
CPC .............................. G06V 20/588; G06V 10/60
See application file for complete search history.

(56) References Cited

U.S. PATENT DOCUMENTS

| | | | | |
|---|---|---|---|---|
| 8,184,859 B2 * | 5/2012 | Tanji | .................... | G06V 10/255 701/28 |
| 9,030,559 B2 * | 5/2015 | Saha | ...................... | G06V 20/54 348/148 |
| 10,140,855 B1 * | 11/2018 | Swaminathan | ........ | G06V 20/58 |
| 2007/0211144 A1 * | 9/2007 | Fujita | ...................... | G08G 1/165 348/142 |
| 2008/0273757 A1 * | 11/2008 | Nakamura | .............. | G06V 20/56 382/104 |
| 2011/0066343 A1 * | 3/2011 | Ota | ........................ | B60W 50/14 701/70 |

(Continued)

FOREIGN PATENT DOCUMENTS

| | | |
|---|---|---|
| JP | 6-233301 A | 8/1994 |
| JP | 2015-179482 A | 10/2015 |
| JP | 2016-4287 A | 1/2016 |

*Primary Examiner* — Solomon G Bezuayehu
(74) *Attorney, Agent, or Firm* — Rimon P.C.

(57) ABSTRACT

A stop line recognition device includes a driving environment information obtainer obtaining driving environment information; and a driving environment recognizer recognizing a driving environment. The driving environment recognizer includes: a stop line candidate detector detecting a stop line candidate from a luminance difference of a road surface; a stop line determiner determining whether the stop line candidate is a stop line; a section line detector detecting at least one section line intersecting the stop line candidate; a luminance distribution processor obtaining a luminance distribution of the section line; and a luminance for stop line false detection pattern detector examining whether a bright portion sandwiched between dark portions is detected in a pre-set search range of the section line. The stop line determiner determines that the stop line candidate is not a stop line when a bright portion sandwiched between dark portions has been detected in the search range.

11 Claims, 12 Drawing Sheets

(56) References Cited

U.S. PATENT DOCUMENTS

| | | | | |
|---|---|---|---|---|
| 2011/0135155 A1* | 6/2011 | Kudo | G08G 1/0962 | 382/104 |
| 2013/0100286 A1* | 4/2013 | Lao | G06V 20/54 | 348/148 |
| 2013/0151135 A1* | 6/2013 | Aubrey | G08G 1/0116 | 701/117 |
| 2014/0168440 A1* | 6/2014 | Tsuchiya | G06V 20/588 | 348/148 |
| 2014/0362222 A1* | 12/2014 | Swaminathan | G08G 1/0116 | 348/149 |
| 2015/0009292 A1* | 1/2015 | Fukata | G06V 20/584 | 348/46 |
| 2015/0071490 A1* | 3/2015 | Fukata | G08G 1/165 | 382/103 |
| 2015/0186733 A1* | 7/2015 | Hayakawa | G06V 20/58 | 382/103 |
| 2015/0363668 A1* | 12/2015 | Kato | G08G 1/167 | 382/104 |
| 2016/0026877 A1* | 1/2016 | Zhang | G06T 3/00 | 348/148 |
| 2016/0026878 A1* | 1/2016 | Zhang | B60R 1/27 | 348/148 |
| 2019/0130198 A1* | 5/2019 | Hayashi | G05D 1/0088 | |
| 2020/0109953 A1* | 4/2020 | Hokai | G06F 16/29 | |
| 2021/0331671 A1* | 10/2021 | Kumano | B60W 30/12 | |
| 2022/0073099 A1* | 3/2022 | Park | B60W 60/0013 | |
| 2022/0198199 A1* | 6/2022 | Thibaux | B60W 60/001 | |
| 2022/0332310 A1* | 10/2022 | Seegmiller | G06V 20/582 | |
| 2023/0278563 A1* | 9/2023 | Xiao | B60W 30/18163 | 701/1 |
| 2023/0290160 A1* | 9/2023 | Kawaharada | G06V 20/582 | |
| 2023/0349719 A1* | 11/2023 | Horihata | G01C 21/3815 | |
| 2023/0373491 A1* | 11/2023 | Adiprasito | B60W 30/18154 | |

\* cited by examiner

STOP LINE RECOGNITION DEVICE

CROSS-REFERENCE TO RELATED APPLICATIONS

The present application claims priority from Japanese Patent Application No. 2022-086745 filed on May 27, 2022, the entire contents of which are hereby incorporated by reference.

BACKGROUND

The disclosure relates to a stop line recognition device capable of preventing false detection of a stop line in advance.

In recent years, various drive assist apparatuses for vehicles such as automobiles have been proposed to reduce the burden on drivers who drive the vehicles, and some of these have already been put into practical use. For example, there has been available a drive assist apparatus configured to recognize a stop line drawn on a road in front of the vehicle based on an image captured by an in-vehicle camera mounted on the vehicle, and stop the vehicle automatically just before the stop line or prompt the driver to decelerate the vehicle.

Techniques for recognizing a stop line in this type of drive assist apparatus are known, such as those disclosed in Japanese Unexamined Patent Application Publication (JP-A) Nos. 6-233301 and 2015-179482. In the techniques disclosed in JP-A Nos. 6-233301 and 2015-179482, when a stop line (a lane line in JP-A No. 6-233301 and a lane boundary line in JP-A No. 2015-179482) is to be detected based on an image captured by an in-vehicle camera, the luminance of the road surface and the stop line in each pixel row of the image is detected on a pixel-by-pixel basis. Then, a luminance value histogram is generated based on the detected luminance of each pixel, and, in the case where a bimodal distribution having the peak luminance value on the bright side and the peak luminance value on the dark side appears in the generated luminance value histogram, the detection target is determined to be a stop line.

SUMMARY

An aspect of the disclosure provides a stop line recognition device. The stop line recognition device includes a driving environment information obtainer and a driving environment recognizer. The driving environment information obtainer is configured to obtain driving environment information in front of a vehicle. The driving environment recognizer is configured to recognize a driving environment in front of the vehicle based on the driving environment information obtained by the driving environment information obtainer. The driving environment recognizer includes a stop line candidate detector and a stop line determiner. The stop line candidate detector is configured to detect a stop line candidate from a luminance difference of a road surface based on the driving environment information obtained by the driving environment information obtainer. The stop line determiner is configured to determine whether the stop line candidate detected by the stop line candidate detector is a stop line. The driving environment recognizer further includes a section line detector, a luminance distribution processor, and a luminance pattern detector for stop line false detection. The section line detector is configured to detect one or more section lines that intersect the stop line candidate detected by the stop line candidate detector; a luminance distribution processor configured to obtain a luminance distribution of each of the one or more section lines detected by the section line detector. The luminance pattern detector for stop line false detection is configured to examine whether a bright portion sandwiched between dark portions is detected in a pre-set search range of each of the one or more section lines detected by the section line detector based on the luminance distribution of the road surface obtained by the luminance distribution processor. The stop line determiner is configured to determine that the stop line candidate detected by the stop line candidate detector is not a stop line when the bright portion sandwiched between the dark portions is detected in the search range by the luminance pattern detector for stop line false detection.

An aspect of the disclosure provides a stop line recognition device including a driving environment information obtainer and circuitry. The driving environment information obtainer includes a sensor and configured to obtain driving environment information in front of a vehicle. The circuitry is configured to recognize a driving environment in front of the vehicle based on the driving environment information obtained by the driving environment information obtainer. The circuitry is configured to detect a stop line candidate from a luminance difference of a road surface based on the driving environment information obtained by the driving environment information obtainer, and determine whether the stop line candidate is a stop line. The circuitry is configured to detect one or more section lines that intersect the stop line candidate, obtain a luminance distribution of each of the one or more section lines, and examine whether a bright portion sandwiched between dark portions is detected in a pre-set search range of each of the one or more section lines based on the obtained luminance distribution of the road surface. The circuitry is configured to, upon detecting the bright portion sandwiched between the dark portions in the search range, determine that the detected stop line candidate is not a stop line.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
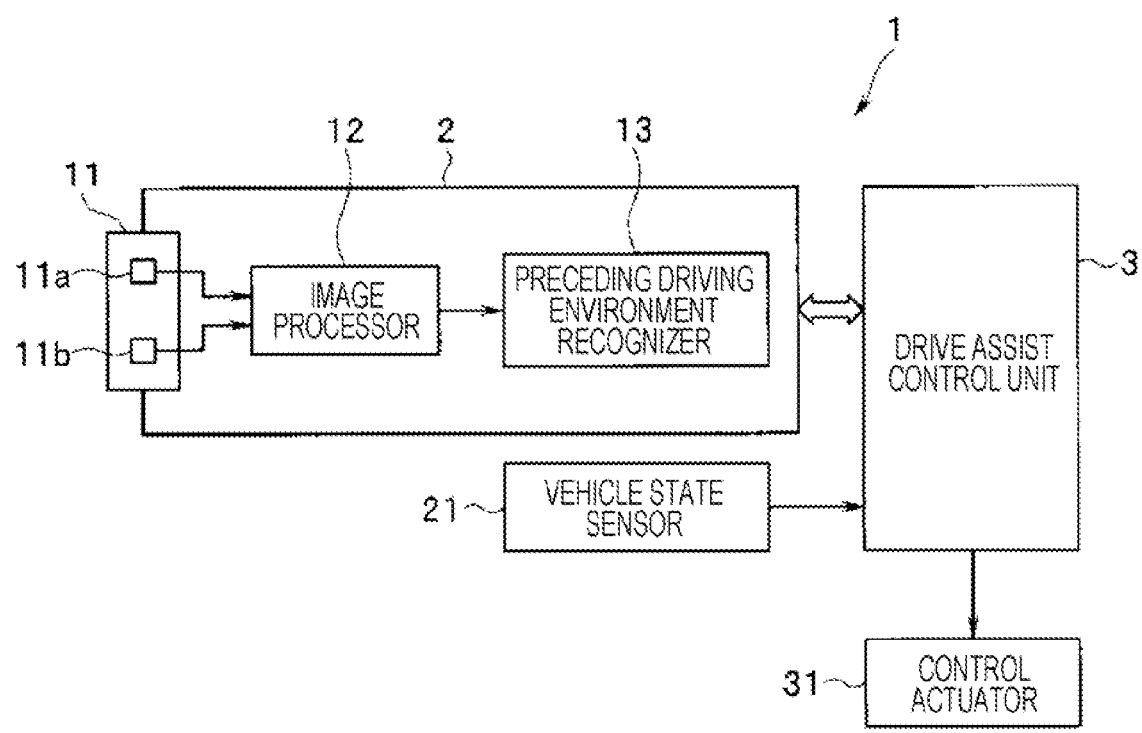
FIG. 1 is a schematic configuration diagram of a drive assist apparatus.

In techniques disclosed in JP-A Nos. 6-233301 and 2015-179482, even in the case where shadows of three-dimensional objects such as two parallel utility poles are projected on the road surface during the day or in the case where a light stream from a street light is projected on the road surface at night, a bimodal distribution may appear in a luminance value histogram, and it may be falsely detected as a stop line.

That is, in the case where shadows of two utility poles are projected onto the road surface, the luminance value of each pixel in each pixel row of an image captured by an in-vehicle camera is such that the luminance value of a section corresponding to the shadows of the poles is less than the luminance value of the ground surface of the road surface. Accordingly, the luminance value histogram has a bimodal distribution between the dark peak luminance value of the shadow portions and the bright peak luminance value of the road surface, which is an intervening portion between the shadows. Moreover, in the case where one light stream is projected onto the road surface at night, the luminance value of the road surface on both sides of the light is less than the luminance value of the light stream. Accordingly, the luminance value histogram has a bimodal distribution between the bright peak luminance value of the light stream portion and the dark peak luminance value of the ground surface portions of the road surface on sides of the light stream portion. As a result, in any of the above-described cases, if a stop line is to be determined from the bimodal distribution in the luminance value histogram, there is a risk of a stop line being falsely determined.

As a countermeasure, JP-A No. 2016-4287 discloses a technique for determining that a lane line (stop line) is being falsely detected if the luminance (average luminance or representative luminance) of a candidate region for the lane line (stop line) and the luminance of a ground surface region of the road surface are about the same. That is, in JP-A No. 2016-4287, in the case where a region sandwiched between two shadows projected onto the road surface is detected as a lane line candidate region, a road surface region parallel to the lane line candidate region is set. Because both the lane line candidate region and the road surface region are the ground surface of the road surface, the luminance of both regions is about the same, and the luminance difference between the two regions is almost zero. Accordingly, in the case where the luminance difference between the two regions is less than a preset threshold, the lane line candidate region is determined to be a false detection.

However, in the technique disclosed in JP-A No. 2016-4287, when a stop line is blurred, the luminance difference between the stop line candidate region in the blurred portion and the road surface region is small. As a result, the detected region is excluded from being a stop line candidate even though the detected region is actually a stop line.

It is desirable to provide a stop line recognition device capable of preventing false detection of a stop line in advance when determining a stop line from a luminance difference of the road surface.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 4:
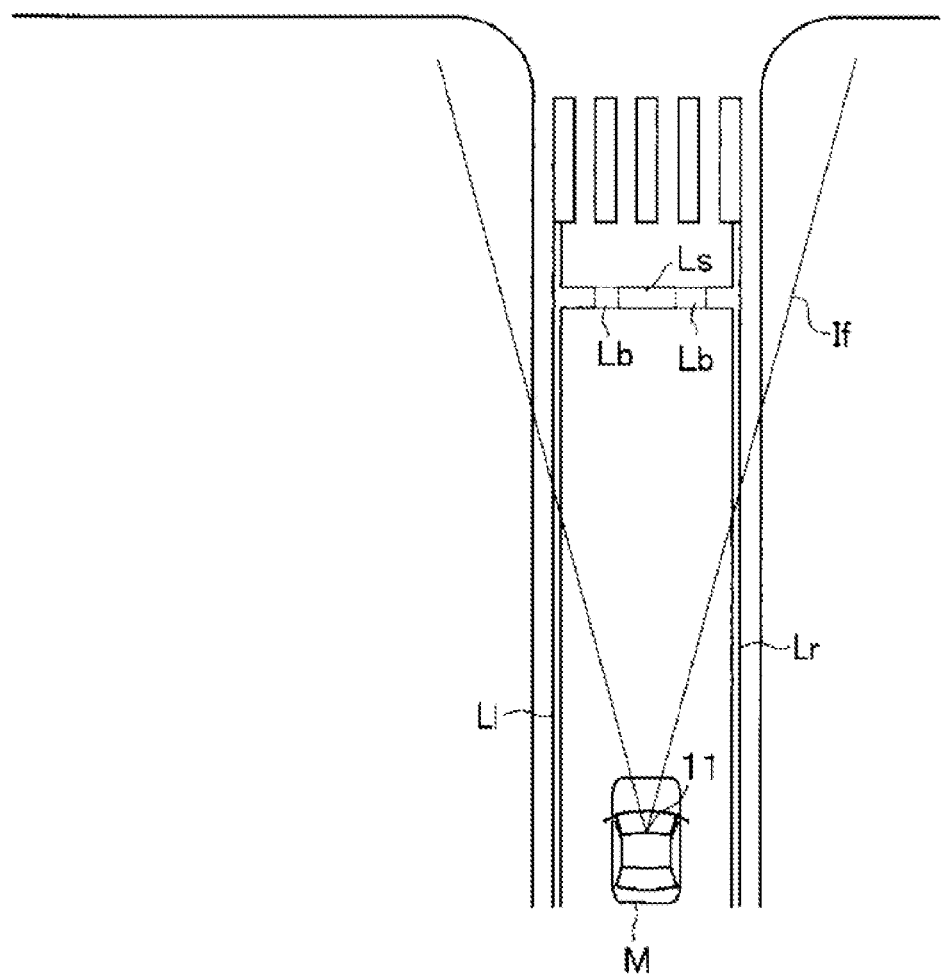
FIG. 4 is a bird's-eye view illustrating a state in which a stop line in front of a vehicle is blurred.

A drive assist apparatus 1 illustrated in FIG. 1 is mounted on a vehicle M (see FIG. 4). The drive assist apparatus 1 includes a camera unit 2 and a drive assist control unit 3, which have the function as a stop line recognition device, and the units 2 and 3 are connected to be able to communicate to and from each other via an in-vehicle communication line such as controller area network (CAN) communication or the like.

The drive assist control unit 3 and a preceding driving environment recognizer 13 of the camera unit 2 described later are constituted of a micro-controller including a central processing unit (CPU), a random-access memory (RAM), a read-only memory (ROM), a rewritable non-volatile memory (flash memory or electrically erasable programmable read-only memory (EEPROM)), and peripheral equipment. The ROM stores in advance programs, fixed data, and the like necessary for the CPU to execute each process. In addition, the RAM is provided as a work area for the CPU, where various types of data used in the CPU are temporarily stored. Note that the CPU is also called a microprocessor (MPU) or a processor. Meanwhile, a graphics processing unit (GPU) or a graph streaming processor (GSP) may be used in place of the CPU. Alternatively, the CPU, GPU, and GSP may be selectively combined and used.

Figure 6:
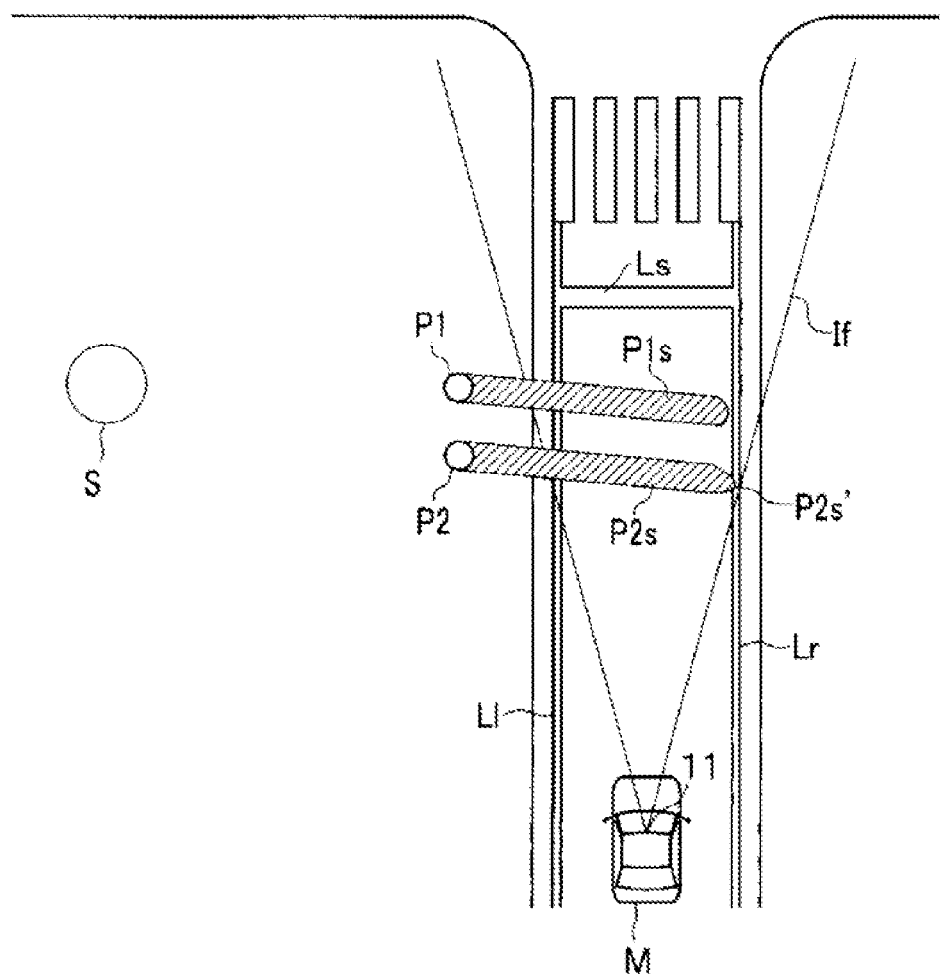
FIG. 6 is a bird's-eye view illustrating a state in which two shadows are projected onto a lane.
Figure 9:
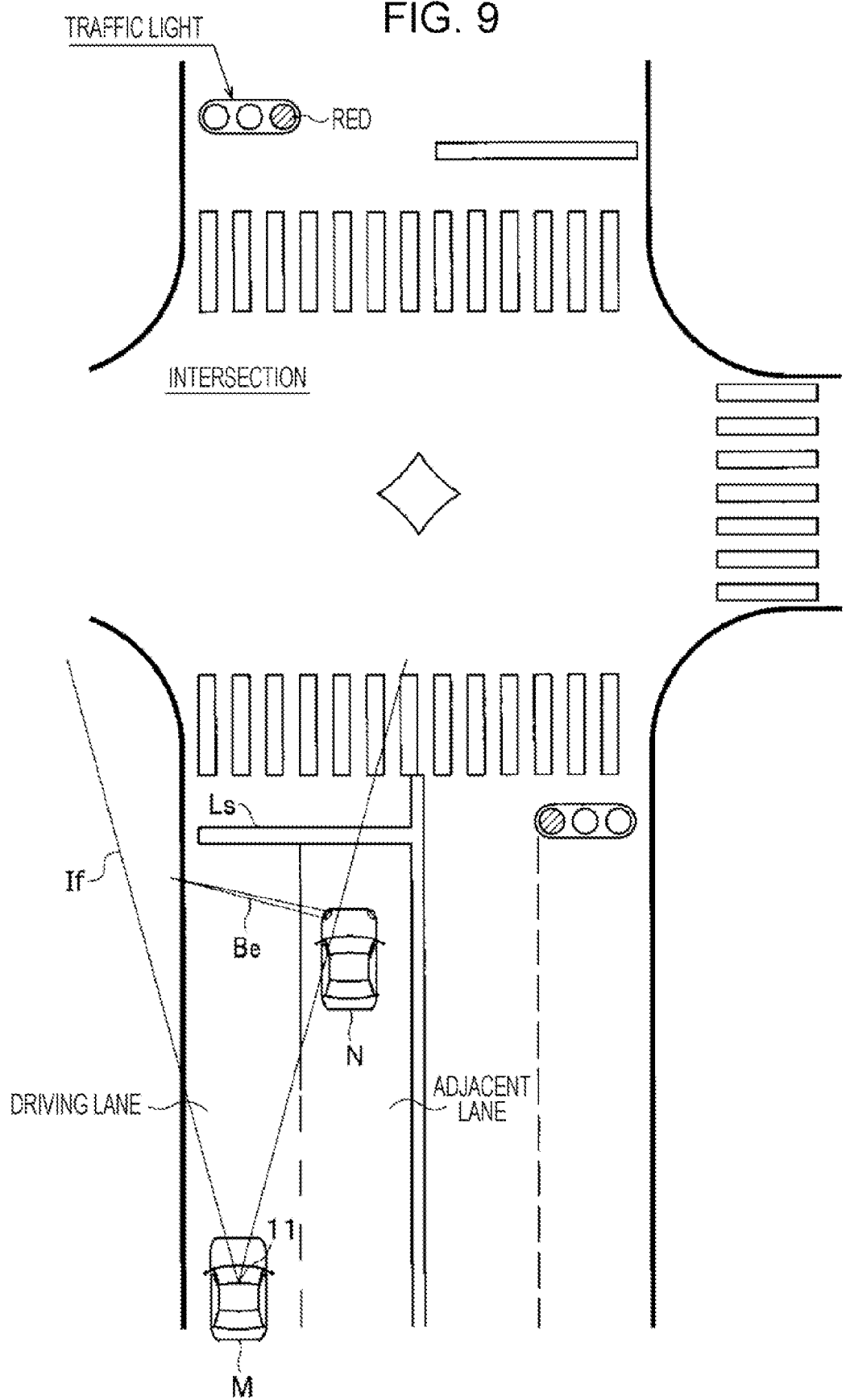
FIG. 9 is a bird's-eye view illustrating a state in which a beam is projected from a vehicle in an adjacent line to a lane where the vehicle is driving.

In addition, the camera unit 2 includes a camera section 11 as a driving environment information obtainer, an image processor 12, and the preceding driving environment recognizer 13. The camera section 11 is a stereo camera consisting of a main camera 11a and a sub camera 11b, and both cameras 11a and 11b are disposed, for example, above the rear-view mirror and at positions close to the windshield, on the left and right sides of the center in the vehicle width direction, at equal intervals with a predetermined baseline length. In addition, each of the cameras 11a and 11b is provided with an image sensor such as a charge-coupled device (CCD) or complementary metal-oxide-semiconductor (CMOS), and the driving environment in front of the vehicle M including the driving lane of the vehicle M is captured by these two image sensors. In the camera section 11, the main camera 11*a* captures a reference image, and the sub camera 11*b* captures a comparison image. Note that reference symbol If in FIGS. 4, 6, and 9 schematically illustrates a viewing angle region where images can be captured by the camera section 11.

A pair of analog images captured by the cameras 11*a* and 11*b* are subjected to certain image processing by the image processor 12, and then output to the preceding driving environment recognizer 13. The preceding driving environment recognizer 13 performs various types of image processing described below, for example, on a frame-by-frame basis based on reference image data and comparison image data from the image processor 12.

Firstly, the preceding driving environment recognizer 13 sequentially extracts small regions of, for example, 4×4 pixels from the reference image, compares the luminance or color pattern of each small region with the comparison image to find corresponding regions, and obtains a distance distribution across the entire reference image. Furthermore, the preceding driving environment recognizer 13 examines luminance differences between the individual pixels on the reference image and their adjacent pixels, extracts pixels whose luminance differences exceed a threshold as edge points, and adds distance information to the extracted pixels (edge points) to generate a distance image (a distribution image of the edge points with the distance information).

Then, the preceding driving environment recognizer 13 performs conventional grouping processing on the generated distance image and compares it with a three-dimensional frame (window) stored in advance, thereby recognizing preceding driving environment information such as a section line that partitions the left or right side of a lane where the vehicle M is driving (vehicle driving lane), a preceding vehicle ahead, a stop line, an intersection, a traffic light, and/or a pedestrian. The preceding driving environment information recognized by the preceding driving environment recognizer 13 is output to the drive assist control unit 3.

Furthermore, a vehicle state sensor 21 is coupled to the input side of the drive assist control unit 3. The vehicle state sensor 21 is a collective term for a group of sensors configure to detect various states regarding the vehicle M. The vehicle state sensor 21 includes a vehicle speed sensor configured to detect the vehicle speed of the vehicle M, a steering angle sensor configured to detect the steering angle of the vehicle M, an acceleration sensor configured to detect forward/backward acceleration acting on the vehicle body, a yaw rate sensor configured to detect a yaw rate acting on the vehicle body, an accelerator opening sensor configured to detect how much the accelerator pedal is depressed, and a signal from a brake switch that is turned ON when the brake pedal is depressed.

Moreover, a control actuator 31 is coupled to the output side of the drive assist control unit 3. The control actuator 31 is a collective term for various types of actuators that control the driving state of the vehicle M and assist the driver's driving operations in accordance with control signals from the drive assist control unit 3. These control actuators include an electric power steering (EPS) actuator configured to drive the EPS, a power actuator configured to control the driving force of a drive source (engine, electric motor, etc.), and a brake actuator configured to control the braking force by adjusting a brake fluid pressure supplied to a brake unit.

The drive assist control unit 3 acts on behalf of some or all of the driving operations (steering wheel operation, acceleration/deceleration operation, and brake operation) performed by the driver based on the preceding driving environment information output from the preceding driving environment recognizer 13 and the state of the vehicle M detected by the vehicle state sensor 21. As drive assist control that acts on behalf of at least some of the driving operations of the driver, adaptive cruise control (ACC), active lane keep bouncing (ALKB) control, and the like are known, but since these are well known, descriptions thereof will be omitted.

Figure 5:
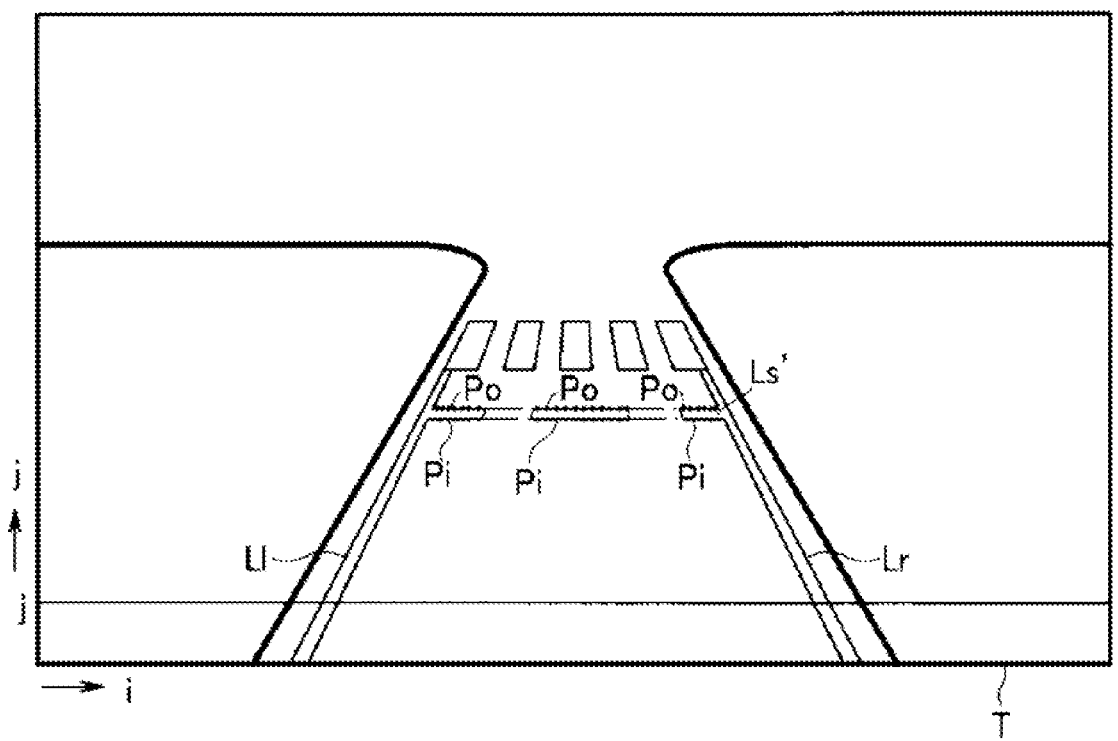
FIG. 5 is an explanatory diagram illustrating a front-portion image in the state illustrated in FIG. 4 captured by an in-vehicle camera.
Figure 12:
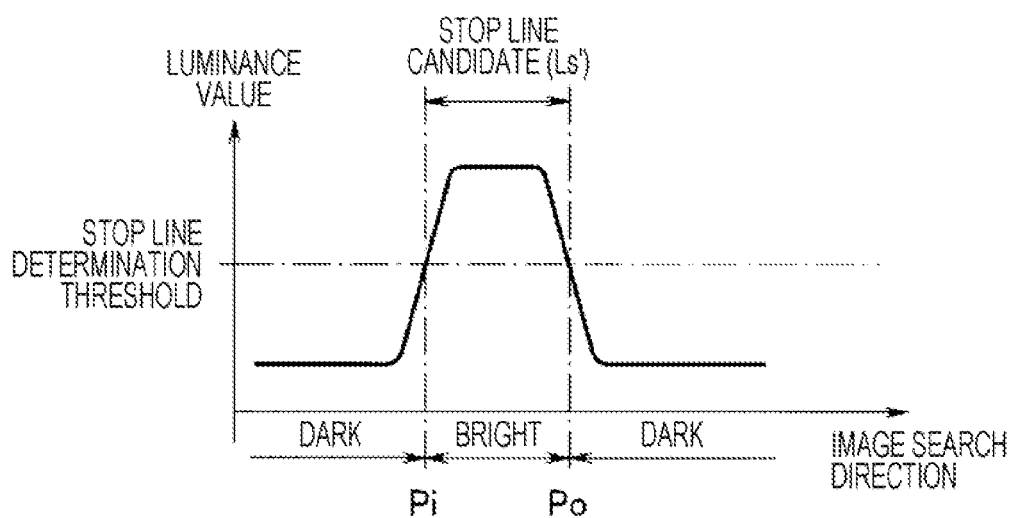
FIG. 12 is an explanatory diagram illustrating a luminance pattern in an image search direction of a stop line candidate.

By the way, as illustrated in FIG. 5, the preceding driving environment recognizer 13 reads the luminance values of the individual pixels toward the i direction at a horizontal line j which is one row of an image T for each frame, and switches this sequentially from the horizontal line j at the bottom to the horizontal line j upward, thereby reading the luminance values of the entire image T. At that time, in the case of extracting a stop line from the luminance of the image, as illustrated in FIG. 12, binarization processing is performed by comparing the luminance values of adjacent pixels above and below the sequentially-switched horizontal line j with a preset stop line determination threshold. Then, a bright region sandwiched between a start point Pi at which darkness switches to brightness and an endpoint Po at which brightness switches to darkness is estimated to be a stop line, and this region is extended in the lane width direction to set a stop line candidate Ls'. Thus, in the image T, the stop line candidate Ls' is to be detected from the luminance pattern (dark→bright→dark) of the road surface.

As illustrated in FIG. 5, even in the case where the middle of the stop line Ls is blurred by friction with tires involved in vehicle passage or the like, the stop line candidate Ls' is set continuously in the lane width direction, but the luminance of the blurred portion of the stop line candidate Ls' is almost the same as the luminance of the road surface. However, if the stop line candidate Ls' is excluded from being a stop line target due to the blurring of the stop line, the above-described drive assist control of the drive assist control unit 3 is hindered.

Figure 7A:
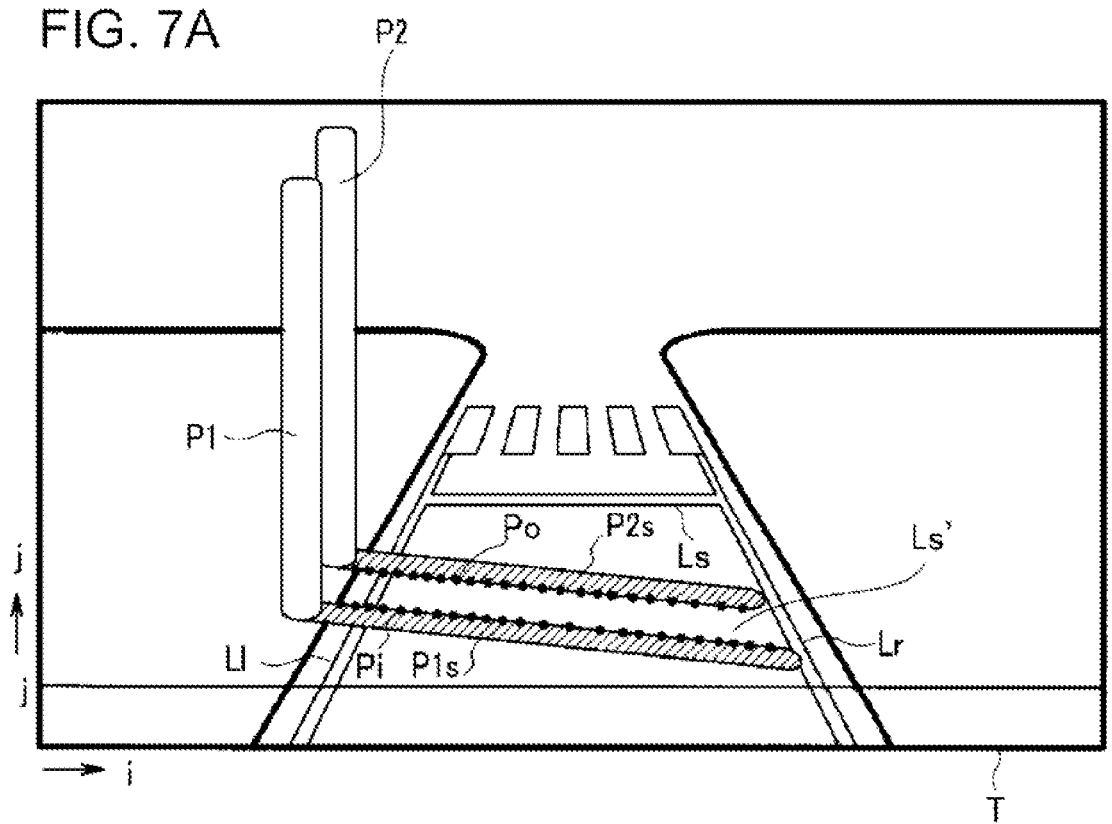
FIG. 7A is an explanatory diagram illustrating a front-portion image in the state illustrated in FIG. 6 captured by the in-vehicle camera.

In contrast, as illustrated in FIG. 6, when two utility poles P1 and P2 erected on the shoulder or sidewalk of the driving lane are illuminated with light from a light source S such as the sun, and two shadows P1*s* and P2*s* thereof are projected parallel onto the road surface of the driving lane, a portion sandwiched between the two shadows P1*s* and P2*s* becomes relatively bright with respect to the two shadows P1*s* and P2*s*. Therefore, as illustrated in FIG. 7A, in the case where the preceding driving environment recognizer 13 tries to extract a stop line from the luminance of the image T per frame, as in FIG. 5 described above, the luminance pattern of the road surface becomes "dark→bright→dark" in the shadows P1*s* and P2*s*, and the stop line candidate Ls' is set. However, if the preceding driving environment recognizer 13 determines that the stop line candidate Ls' set in the region sandwiched between the two shadows P1*s* and P2*s* is a stop line, the drive assist control of the drive assist control unit 3 is hindered.

Figure 8:
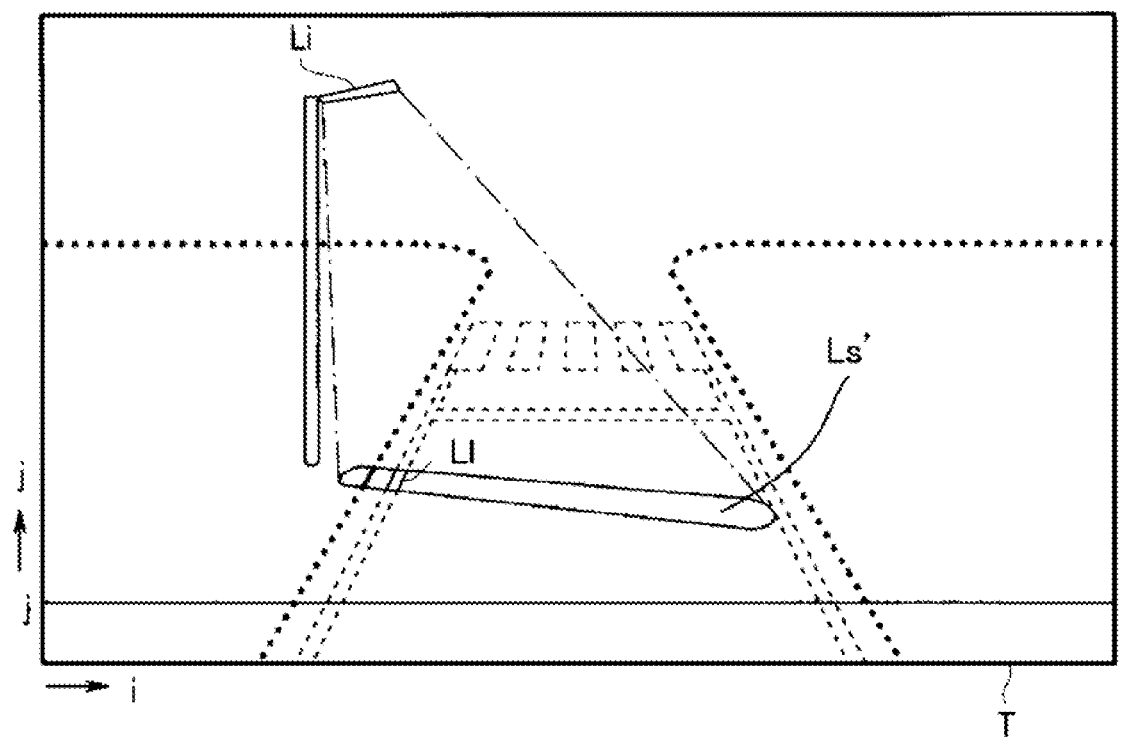
FIG. 8 is an explanatory diagram illustrating a front-portion image at night captured by the in-vehicle camera.

In addition, at night, when the road surface is illuminated with illumination light, the illuminated portion becomes "bright", which may result in the formation of the luminance pattern "dark→bright→dark" on the road surface. For example, as illustrated in FIG. 8, the illumination light of a street lamp Li, which is erected on the shoulder or sidewalk of the driving lane, is emitted to the road surface, and this illumination light may result in the formation of the luminance pattern "dark→bright→dark" on the road surface. Even in such a case, the preceding driving environment recognizer 13 sets the stop line candidate Ls' on the road surface from the luminance pattern "dark→bright→dark".

Figure 10:
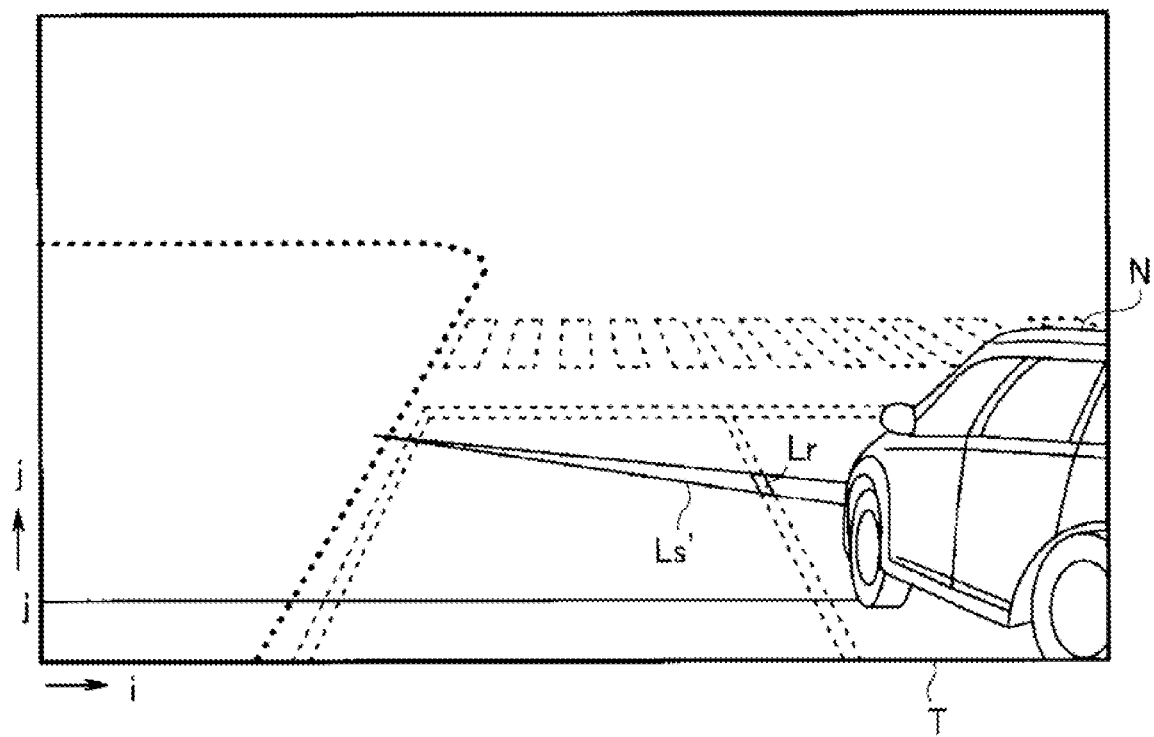
FIG. 10 is an explanatory diagram illustrating a front-portion image in the state illustrated in FIG. 9 captured by the in-vehicle camera.

Furthermore, as illustrated in FIG. 9, in the case of driving at night, a beam Be may be emitted from the headlamp (high beam, low beam, auxiliary light, etc.) in a direction from a vehicle (adjacent vehicle) N driving in a lane (adjacent lane) adjacent to the driving lane of the vehicle M to the driving lane of the vehicle M. When the adjacent vehicle N slows down or stops just before the stop line Ls, as illustrated in FIG. 10, the luminance pattern "dark→bright→dark" is formed on the road surface by the illumination with the beam Be in the image T for one frame. As a result, the preceding driving environment recognizer 13 sets the stop line candidate Ls' at a portion illuminated with the beam Be.

Accordingly, the preceding driving environment recognizer 13 is equipped with the function of evaluating whether the stop line candidate Ls' set in the image T is a stop line target. The stop line candidate evaluation function provided in the preceding driving environment recognizer 13 is executed in accordance with, in one example, a routine of a process for evaluating a stop line candidate illustrated in FIG. 2.

In this routine, first, in step S1, preceding driving environment information obtained by the camera section 11 and processed in a certain manner by the image processor 12 is read. The routine then proceeds to step S2, where a stop line candidate Ls' is detected based on the preceding driving environment information. In one embodiment, the processing in step S2 may serve as a process performed by a "stop line candidate detector". Note that the detection of the stop line candidate Ls' has been described previously, so the description thereof will be omitted here. Alternatively, the stop line candidate Ls' may be detected according to another program.

Then, the routine proceeds to step S3, where it is examined whether the stop line candidate Ls' has been detected. Then, if the stop line candidate Ls' has been detected, the routine proceeds to step S4. If no stop line candidate Ls' has been detected, the routine is exited. Hereinafter, left and right section lines Ll and Lr may be collectively referred to as section lines L.

Proceeding to step S4, the left and right section lines Ll and Lr partitioning the driving lane, which are near the set stop line candidate Ls', are detected. The method of detecting the section lines L is variously known, for example, as disclosed in JP-A No. 2022-60118, which has already been submitted by the present applicant. The method of detecting the section lines L disclosed in JP-A No. 2022-60118 will be briefly described. Note that, in one embodiment, the processing in step S4 may serve as a process performed by a "section line detector".

In step S4, first, at the horizontal line j of the image T, a search is conducted along the horizontal line j from the center of the image T in the i direction toward the outside. Then, an edge point at which the luminance of a pixel inside the driving lane of the vehicle M is relatively low with respect to the luminance outside, and at which the luminance differential value indicating an amount of change thereof is greater than or equal to a set threshold on the + side, is extracted as a section line start point. Meanwhile, an edge point at which the luminance of a pixel inside is relatively high with respect to the luminance of a pixel outside, and at which the luminance differential value indicating an amount of change thereof is less than or equal to the set threshold on the − side, is extracted as a section line endpoint.

Next, the section line start point and the section line endpoint are plotted on the image as section line candidate points; while the horizontal line j is being switched, sampling is continuously performed from the bottom of the image upward to set a point row of section line candidate points, and, based on the point row, an approximate line representing the edge (boundary) of a section line L is obtained. From this approximate line, the section line L of this one frame is generated. In this case, it may be determined whether the section line L is a solid line or a dashed line. Moreover, in the case where no point row of section line candidate points is set, no section line is detected.

The routine then proceeds to step S5, where it is examined whether at least one section line L (Ll or Lr) has been detected on one side. If no section line L has been detected on the left or right side, the routine is exited without determining whether the stop line candidate Ls' has been falsely detected. In this case, the driver may be notified that it could not be determined whether the stop line candidate Ls' is the actual stop line Ls.

If one or more of the left and right section lines Ll and Lr has been detected, the routine proceeds to step S6. In step S6, an intervening portion between dark portions of the section line L is detected. The intervening portion between dark portions of the section line L refers to a region where a portion having the luminance of the section line L, serving as a bright portion, is sandwiched front to back between the shadows P1s and P2s.

Figure 3:
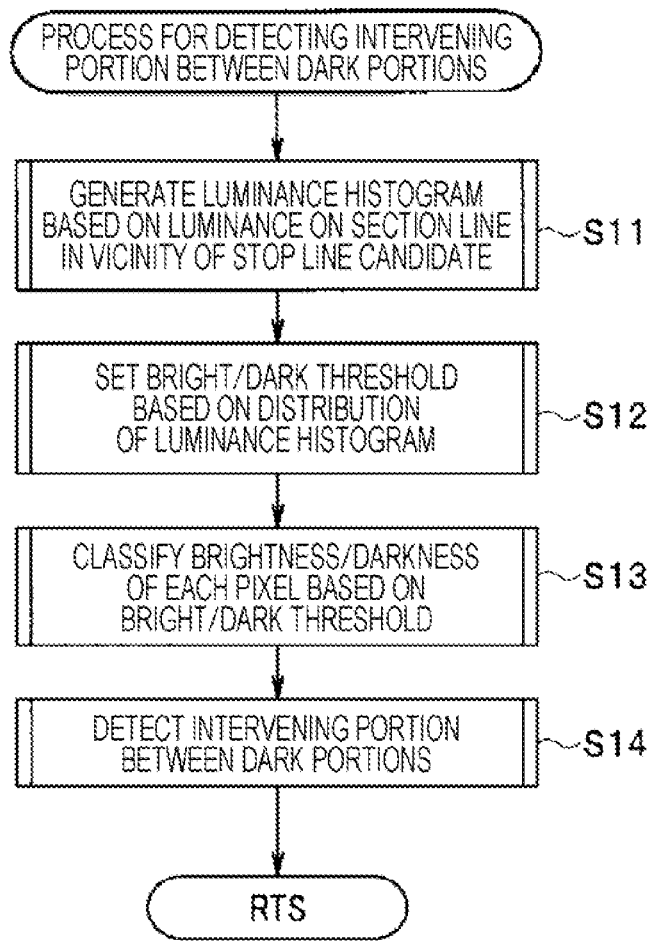
FIG. 3 is a flowchart illustrating a routine of a process for detecting an intervening portion between dark portions.

The intervening portion between dark portions is detected according to a subroutine of a process for detecting an intervening portion between dark portions illustrated in FIG. 3. Moreover, if the left and right section lines Ll and Lr are detected, the intervening portion between dark portions may be detected based on these section lines Ll and Lr. Alternatively, the gap may be detected based on one of the section lines L. However, even in the case where the left and right section lines Ll and Lr are detected, as illustrated in the image T in FIG. 7A, for example, the left section line Ll is traversed by the shadows P1s and P2s, whereas slightly a tip of the shadow P1s overlaps the right section line Lr. In such a case, if the intervening portion between dark portions is separately detected based on the two section lines Ll and Lr, false detection of a stop line can be prevented with higher accuracy.

In this subroutine, first, a luminance value histogram that has a luminance value on the horizontal axis and a count value (frequency) on the vertical axis is generated based on the luminance of the section line L near the stop line candidate in step S11. Note that, in one embodiment, the processing in step S11 may serve as a process performed by a "luminance distribution processor".

Figure 7B:
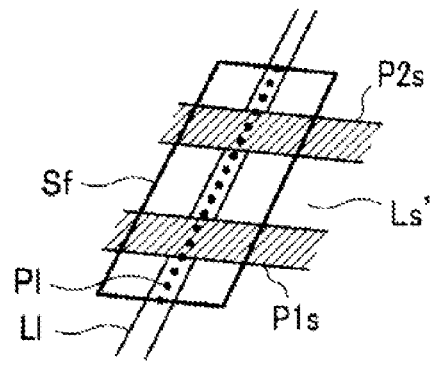
FIG. 7B is an explanatory diagram illustrating a row of points sampled along a section line based on the image illustrated in FIG. 7A.
Figure 7C:
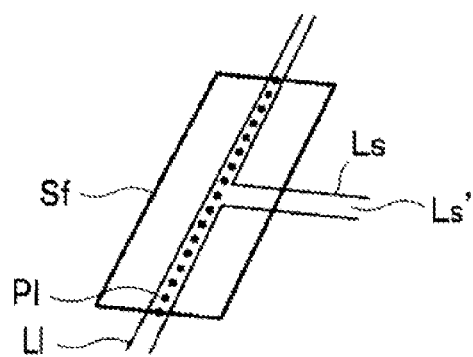
FIG. 7C is an explanatory diagram illustrating a row of points sampled along a section line near a stop line.

Regarding the luminance value histogram, as illustrated in FIGS. 7B and 7C, a search range (section line search range) Sf is first set for the section line L (Ll in the drawings) detected near the stop line candidate Ls'. This section line search range Sf is set to a region of a set length in the upward and downward directions across the approximate center of the width of the stop line candidate Ls'. Note that the upper limit of this length is about 3.5/2 [m] in the upward and downward directions across the approximate center of the width of the stop line candidate Ls'.

Then, in the upward and downward regions of the section line search range Sf, a luminance for each pixel P1 is detected along the approximate center of the section line L. In the case where the left and right section lines L are detected, the section line search range Sf is set individually based on the left and right section lines Ll and Lr, and the luminance of the pixel P1 on each of the section lines Ll and Lr is detected and counted for each bin having the assigned luminance values (see FIGS. 11A to 11C).

Figure 11A:
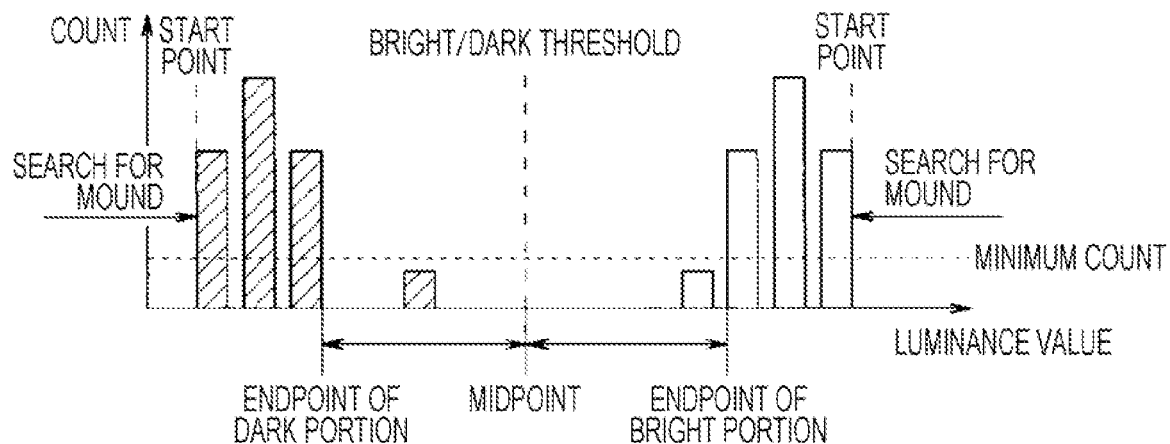
FIG. 11A is a luminance value histogram on a section line having a bimodal frequency distribution.
Figure 11B:
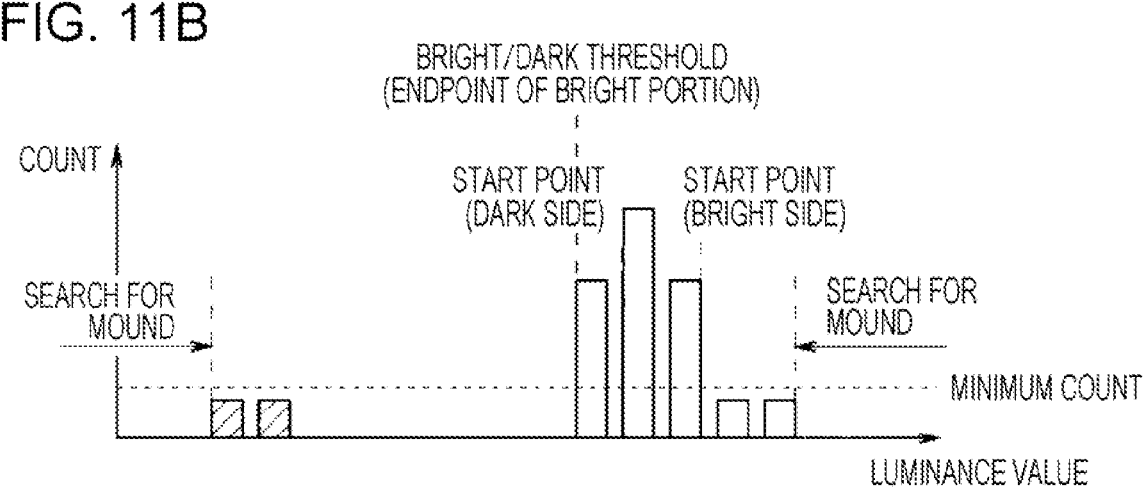
FIG. 11B is a luminance value histogram on a section line having a unimodal frequency distribution on a bright side.
Figure 11C:
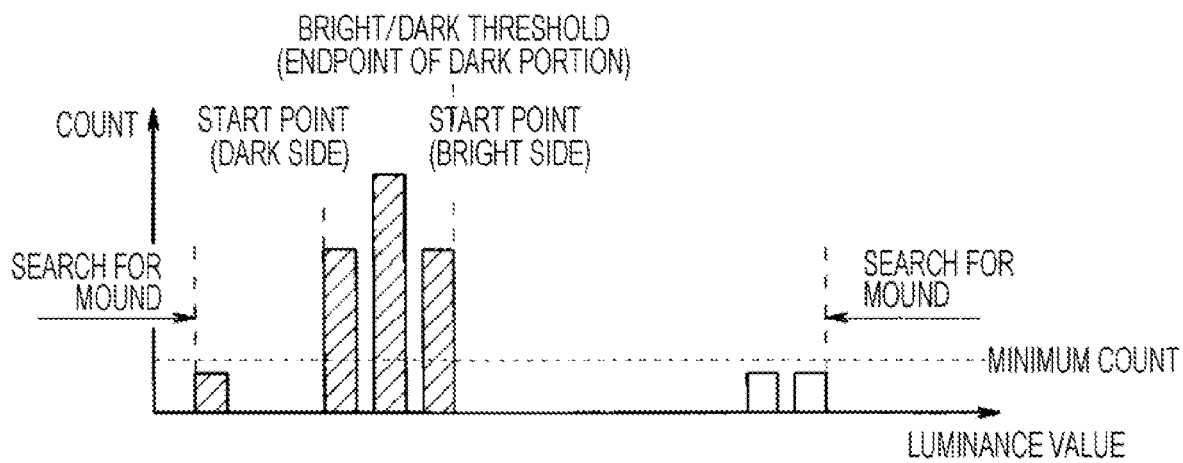
FIG. 11C is a luminance value histogram on a section line having a unimodal frequency distribution on a dark side.

The routine then proceeds to step S12, where a threshold for bright/dark portions (bright/dark threshold) is set based on the frequency distribution of the luminance value histogram. As illustrated in FIGS. 11A to 11C, in the setting of this bright/dark threshold, the luminance value histogram is first searched from both the bright side and the dark side, with the first bin that exceeds a preset minimum count being a start point. Then, in the case where bins that fall below than the minimum count are consecutive for a preset threshold or more, bins from the start point to the last bin exceeding the minimum count are specified as a mound of bins.

Next, the bright/dark threshold is set according to the number of mounds identified. For example, as illustrated in FIGS. 7A and 7B, in the case where the left section line Ll is traversed by two shadows P1s and P2s, the luminance of the section line L (Ll) in the shadow P1s and P2s portions is low (dark portions), and the luminance of the left section line Ll sandwiched between the shadow P1s and P2s is high (bright portion). Therefore, two different mounds (bimodal) are detected on the bright side and the dark side, as illustrated in FIG. 11A.

In contrast, in the case where the vicinity of the stop line Ls detected in the image T in FIG. 7A is set as the stop line candidate Ls', and, as illustrated in FIG. 7C, the shadows P1s and P2s are not projected to the section line L (Ll in the drawing) within the section line search range Sf corresponding to the stop line candidate Ls', the luminance histogram will be as illustrated in FIG. 11B. That is, this luminance histogram is unimodal having a mound on the bright side. Similarly, even in a state in which the tip of the shadow P1s slightly overlaps the right section line Lr illustrated in the image T of FIG. 7A, the shape of the luminance histogram is as illustrated in FIG. 11B.

Then, in the case where two mounds (bimodal) are detected in the frequency distribution of the luminance histogram, the preceding driving environment recognizer 13 detects an endpoint of the last bin of the two mounds (an endpoint of the dark portion and an endpoint of the bright portion), as illustrated in FIG. 11A. Next, the luminance value of the midpoint between these endpoints is set as the bright/dark threshold. In contrast, in the case where the frequency distribution of the luminance histogram has a single mound (unimodal), the preceding driving environment recognizer 13 compares the number of bins remaining without reaching the minimum count between the bright side and the dark side across the detected mound, and sets the endpoint of the mound on the side with a larger number of bins remaining as the bright/dark threshold. Accordingly, in FIG. 11B, the bright/dark threshold that has a relatively low luminance is set. Meanwhile, in FIG. 11C, the bright/dark threshold that has a relatively high luminance is set. Note that the above-described setting of the bright/dark threshold is merely one example, and is not limited thereto.

After that, the program proceeds to step S13, where the brightness/darkness of the pixels in the section line search range Sf is classified based on the bright/dark threshold set in step S12 above. The brightness/darkness classification of each pixel is performed by, for example, searching the image T illustrated in FIG. 7A from the bottom to the top while switching the horizontal line j, upon which the pixels in the section line search range Sf are subjected to binarization processing based on the bright/dark threshold.

Figure 13:
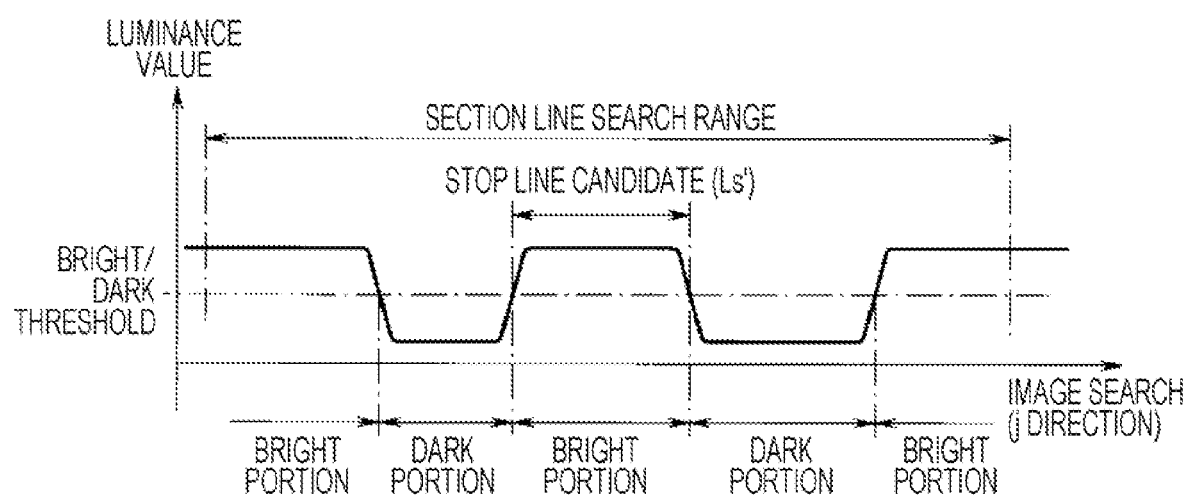
FIG. 13 is an explanatory diagram illustrating a luminance pattern in an image search direction of a section line search region.

As a result, for example, portions corresponding to the shadows P1s and P2s in the image T of FIG. 7A become dark portions illustrated in FIG. 13, and the brightness/darkness of the pixels in the section line search range Sf of the image T has the luminance pattern "bright→dark→bright→dark-→bright" from the bottom to the top of the image T, resulting in detection of a bright portion between the dark portion and the dark portion. In addition, the stop line candidate Ls' is set in the vicinity of the stop line Ls in FIG. 7A, and, in the section line search range Sf set crossing the stop line candidate Ls', the bright/dark threshold is set to be relatively low, and thus the luminance pattern of the section line L is substantially "bright".

Figure 2:
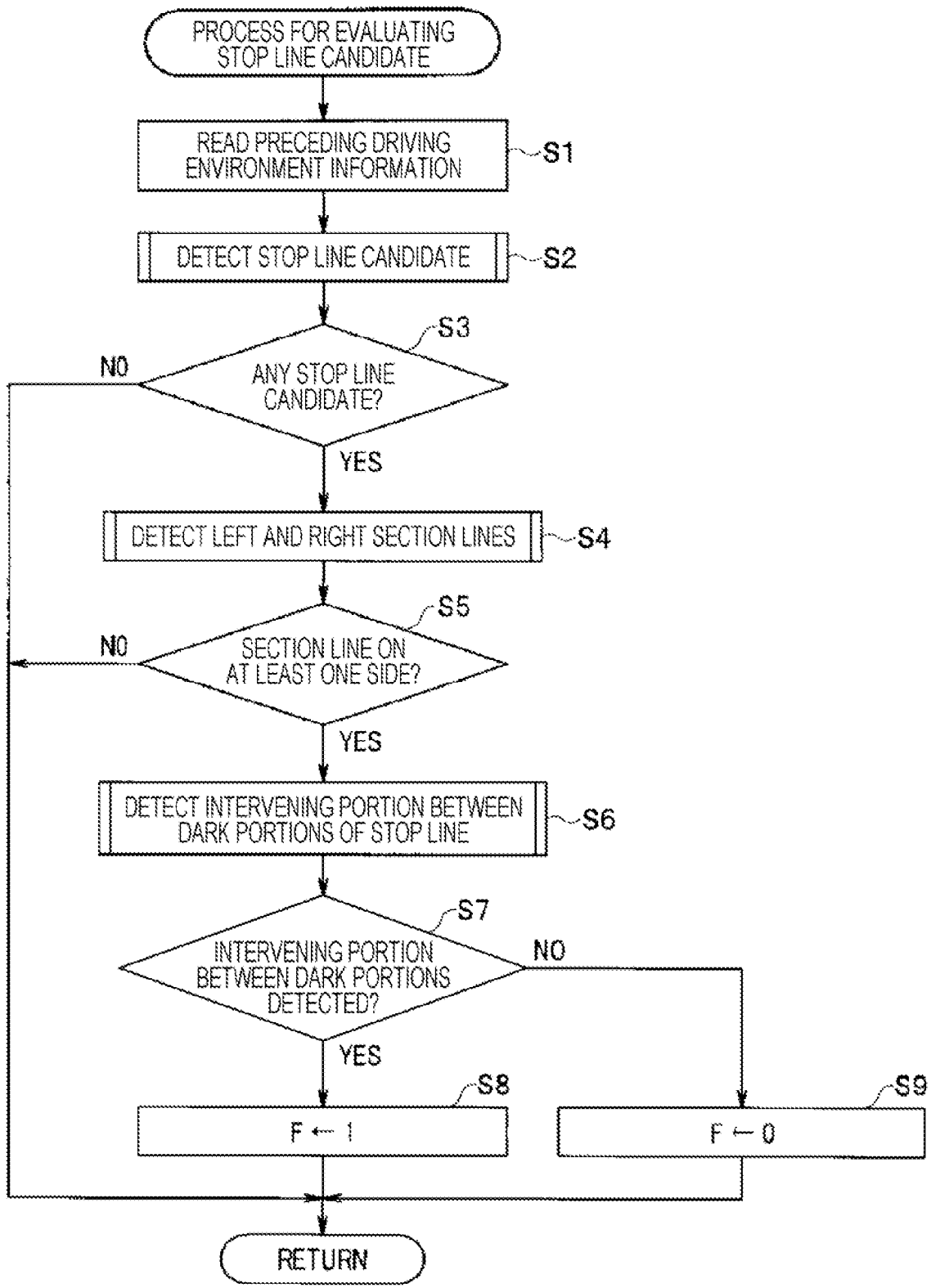
FIG. 2 is a flowchart illustrating a routine of a process for evaluating a stop line candidate.

Proceeding to step S14, based on the classified brightness/darkness of the pixels in the section line search range Sf in step S13 above, whether the luminance pattern has "an intervening portion between dark portions" is examined, and the routine proceeds to step S7 in FIG. 2.

In step S14, if the luminance pattern is "dark→bright-→dark" and the width of the bright portion of the luminance pattern (the width in the vertical direction of the image T) fits within a preset range, the bright portion is set as an "intervening portion between dark portions". Meanwhile, in the case where the luminance pattern is not "dark→bright-→dark" or the width of the bright portion is outside the preset range, that is, in the case where the luminance pattern of the section line L is substantially "bright" or "dark", it is determined that no intervening portion between dark portions has been detected. Note that the upper limit of the width of the bright portion in this case is, for example, about 3.5 [m]. Note that, in one embodiment, the processing in steps S12 to S14 may serve as a process performed by a "s luminance pattern detector for stop line false detection".

After that, proceeding to step S7 in FIG. 2, it is examined in step S6 whether an intervening portion between dark portions has been detected, and, in the case where an intervening portion between dark portions has been detected, it is determined that the stop line of the stop line candidate Ls' is a false detection, the routine proceeds to step S8, where a detection flag F for an intervening portion between dark portions is set (F←1), and the routine is exited. In contrast, in the case where it is determined that no intervening portion between dark portions has been detected, the stop line candidate Ls' is determined to be a stop line, the routine branches to step S9, where the detection flag F for an intervening portion between dark portions is cleared (F←0), and the routine is exited. Note that, in one embodiment, the processing in steps S7 to S9 may serve as a process performed by a "stop line determiner".

The value of the detection flag F for an intervening portion between dark portions is read when the stop line candidate Ls' is recognized by the preceding driving environment recognizer 13. Then, when F=1, it is recognized that the recognized stop line candidate Ls' is not the actual stop line, but is a false detection. As a result, the information of the stop line Ls is not output from the preceding driving environment recognizer 13 to the drive assist control unit 3, and thus the drive assist control unit 3 allows the vehicle M to continuously drive without executing drive assist control such as automatic stop control for stopping the vehicle M on the stop line or notification control for prompting the driver to slow down.

In the case where the detection flag F for an intervening portion between dark portions has been cleared (F=0), the preceding driving environment recognizer 13 recognizes that the recognized stop line candidate Ls' is the stop line Ls, and outputs the information of the stop line Ls to the drive assist control unit 3. As a result, the drive assist control unit 3 operates the control actuator 31 to perform drive assist control as usual, such as decelerating and automatically stopping the vehicle M just before the stop line Ls.

As described thus far, in the present embodiment, the preceding driving environment recognizer 13 first searches for the luminance pattern of the road surface based on the preceding driving environment information. Then, in the case where the luminance pattern "dark→bright→dark" is detected on the road surface, the stop line candidate Ls' is set by extending, in the lane width direction, a bright region sandwiched between the start point Pi at which the luminance pattern switches from dark to bright and the endpoint Po at which the luminance pattern switches from bright to dark. Next, the left and right section lines Ll and Lr partitioning the driving lane, which are in the vicinity of the stop line candidate Ls' and which intersect the stop line candidate Ls', are detected.

Then, in the case where an intervening portion between dark portions, which is sandwiched between two shadows P1s and P2s covering the section line L, is detected on one or more of the section lines Ll and Lr, it is determined that the stop line candidate Ls' is not a stop line. Accordingly, false detection of a stop line can be prevented in advance. In addition, since the stop line candidate Ls' is detected based on the luminance pattern "dark→bright→dark" as in the past, the stop line Ls can be detected correctly even if the stop line Ls is blurred in the middle.

Note that the disclosure is not limited to the above-described embodiment, and, for example, the bright/dark threshold to be set based on the luminance histogram may be increased in accuracy by adding or multiplying different coefficients during daytime and nighttime.

The camera unit 2 and drive assist control unit 3 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the camera unit 2 including the image processor 12 and the preceding driving environment recognizer 13, and the drive assist control unit 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

What is claimed is:

1. A stop line recognition device comprising:
a driving environment information obtainer configured to obtain driving environment information in front of a vehicle; and
a driving environment recognizer configured to recognize a driving environment in front of the vehicle based on the driving environment information obtained by the driving environment information obtainer, wherein
the driving environment recognizer comprises:
a stop line candidate detector configured to detect a stop line candidate from a luminance difference of a road surface based on the driving environment information obtained by the driving environment information obtainer; and
a stop line determiner configured to determine whether the stop line candidate detected by the stop line candidate detector is a stop line,
the driving environment recognizer further comprises:
a section line detector configured to detect one or more section lines that intersect the stop line candidate detected by the stop line candidate detector;
a luminance distribution processor configured to obtain a longitudinal luminance distribution along each of the one or more section lines detected by the section line detector; and
a luminance pattern detector for stop line false detection configured to examine whether a bright portion sandwiched between dark portions is detected in a pre-set search range of each of the one or more section lines detected by the section line detector based on the longitudinal luminance distribution of the road surface obtained by the luminance distribution processor,
the stop line determiner is configured to determine that the stop line candidate detected by the stop line candidate detector is not a stop line when the bright portion sandwiched between the dark portions is detected in the search range by the luminance pattern detector for stop line false detection, and
the stop line recognition device further comprises a drive assist control unit configured to, when the stop line determiner determines that the stop line candidate is a stop line, control at least braking of the vehicle based on a position of the determined stop line.

2. The stop line recognition device according to claim 1, wherein
the one or more section lines include a left section line and a right section line,
the luminance pattern detector for stop line false detection is configured to examine whether the bright portion sandwiched between the dark portions is detected based on one or both of the left section line and right section line.

3. The stop line recognition device according to claim 1, wherein the luminance pattern detector for stop line false detection is configured to obtain a luminance value frequency distribution based on the longitudinal luminance distribution of the road surface obtained by the luminance distribution processor, calculate a threshold based on the luminance value frequency distribution, and classify the bright portion and the dark portions based on the threshold.

4. The stop line recognition device according to claim 2, wherein the luminance pattern detector for stop line false detection is configured to obtain a luminance value frequency distribution based on the longitudinal luminance distribution of the road surface obtained by the luminance distribution processor, calculate a threshold based on the luminance value frequency distribution, and classify the bright portion and the dark portions based on the threshold.

5. The stop line recognition device according to claim 3, wherein, the luminance pattern detector for stop line false detection is configured to, when the luminance value frequency distribution is bimodal, set a midpoint between two peaks of the luminance value frequency distribution as the threshold.

6. The stop line recognition device according to claim 4, wherein, the luminance pattern detector for stop line false detection is configured to, when the luminance value frequency distribution is bimodal, set a midpoint between two peaks of the luminance value frequency distribution as the threshold.

7. The stop line recognition device according to claim 3, wherein the threshold is set to different values during daytime and during nighttime.

8. The stop line recognition device according to claim 4, wherein the threshold is set to different values during daytime and during nighttime.

9. The stop line recognition device according to claim 5, wherein the threshold is set to different values during daytime and during nighttime.

10. The stop line recognition device according to claim 6, wherein the threshold is set to different values during daytime and during nighttime.

11. A stop line recognition device comprising:
 a driving environment information obtainer including a sensor and configured to obtain driving environment information in front of a vehicle; and
 circuitry configured to:
  recognize a driving environment in front of the vehicle based on the driving environment information obtained by the driving environment information obtainer,
  detect a stop line candidate from a luminance difference of a road surface based on the driving environment information obtained by the driving environment information obtainer;
  determine whether the detected stop line candidate is a stop line,
  detect one or more section lines that intersect the stop line candidate,
  obtain a longitudinal luminance distribution along each of the one or more section lines;
  examine whether a bright portion sandwiched between dark portions is detected in a pre-set search range of each of the one or more section lines based on the obtained longitudinal luminance distribution of the road surface;
  upon detecting the bright portion sandwiched between the dark portions in the search range, determine that the detected stop line candidate is not a stop line; and
  upon determining that the stop line candidate is a stop line, control at least braking of the vehicle based on a position of the determined stop line.

* * * * *